(12) United States Patent
Barger

(10) Patent No.: US 11,794,877 B2
(45) Date of Patent: Oct. 24, 2023

(54) INTEGRATED ASSYMMETRY BRAKE MECHANISM

(71) Applicant: Hamilton Sundstrand Corporation, Charlotte, NC (US)

(72) Inventor: Victor Barger, Lake in the Hills, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 115 days.

(21) Appl. No.: 17/128,373

(22) Filed: Dec. 21, 2020

(65) Prior Publication Data

US 2022/0194558 A1 Jun. 23, 2022

(51) Int. Cl.
*B64C 13/28* (2006.01)
*B64D 45/00* (2006.01)

(52) U.S. Cl.
CPC .... *B64C 13/341* (2018.01); *B64D 2045/0085* (2013.01)

(58) Field of Classification Search
CPC ..... B64C 13/34; B64C 13/341; B64C 13/343; B64C 13/42; B64C 13/44; B64C 13/506; B64D 2045/0085; F16D 59/02; F16D 67/06
See application file for complete search history.

(56) References Cited

U.S. PATENT DOCUMENTS

| | | |
|---|---|---|
| 4,441,675 A | 4/1984 | Boehringer et al. |
| 5,441,131 A | 8/1995 | Mayer et al. |
| 5,743,490 A | 4/1998 | Gillingham et al. |
| 6,196,361 B1 | 3/2001 | Russ et al. |
| 8,393,442 B2 | 3/2013 | Lang et al. |
| 8,978,840 B2 | 3/2015 | Lang et al. |
| 10,081,419 B2 * | 9/2018 | Jones ............. B64C 13/16 |

(Continued)

FOREIGN PATENT DOCUMENTS

| | | |
|---|---|---|
| EP | 3037346 A1 | 6/2016 |
| EP | 4180282 A1 * | 5/2023 |

OTHER PUBLICATIONS

Extended European Search Report and Written Opinion for European Application No. 21216166.5; dated May 3, 2022 (pp. 1-7).

(Continued)

*Primary Examiner* — Joshua J Michener
*Assistant Examiner* — Ryan Andrew Yankey
(74) *Attorney, Agent, or Firm* — CANTOR COLBURN LLP

(57) ABSTRACT

An integrated asymmetric brake system for an aircraft includes a housing and a control surface actuator arranged in the housing. The control surface actuator includes a torque limiter output member and is operable to selectively deploy and retract a control surface. An asymmetry brake system is arranged in the housing and is operably connected to the control surface actuator and the torque limiter output member. The asymmetry brake system is selectively operable to prevent deployment of the control surface by activating the torque limiter output member upon detecting an asymmetry event. An asymmetry brake test monitor switch is mounted in the housing and operably coupled to the asymmetry brake system. The asymmetry brake test monitor switch is monitored to confirm functionality of the asymmetry brake system prior to flight.

6 Claims, 5 Drawing Sheets

(56) References Cited

U.S. PATENT DOCUMENTS

| | | | | |
|---|---|---|---|---|
| 10,359,089 B1* | 7/2019 | Wlaznik | ............... | B64C 3/50 |
| 11,511,715 B2* | 11/2022 | Gerber | ............... | B60T 17/083 |
| 11,512,750 B2* | 11/2022 | Gerber | ............... | B60T 13/741 |
| 11,697,510 B2* | 7/2023 | Buenvenida | ............ | B64C 13/28 |
| | | | | 701/29.6 |
| 2003/0114265 A1* | 6/2003 | Larson | ............... | B64C 13/341 |
| | | | | 475/249 |
| 2007/0227838 A1* | 10/2007 | Shigeta | ............... | F16D 65/567 |
| | | | | 188/162 |
| 2008/0084130 A1* | 4/2008 | Darby | ............... | H02K 7/06 |
| | | | | 310/83 |
| 2010/0038493 A1* | 2/2010 | Lang | ............... | B64D 45/0005 |
| | | | | 244/224 |
| 2011/0039652 A1* | 2/2011 | Ekonen | ............... | F16H 57/04 |
| | | | | 475/161 |
| 2018/0142778 A1* | 5/2018 | Carrie | ............... | F16H 57/12 |
| 2018/0319483 A1* | 11/2018 | Mayer | ............... | B60T 8/1703 |
| 2020/0055590 A1* | 2/2020 | Morgan | ............... | B64C 13/341 |
| 2020/0156764 A1* | 5/2020 | Tzabari | ............... | B64C 13/34 |
| 2021/0284120 A1* | 9/2021 | Georgin | ............... | B60T 17/221 |
| 2021/0362835 A1* | 11/2021 | Eickelberg | ............ | B64C 13/503 |
| 2023/0202445 A1* | 6/2023 | Casadio | ............... | B60T 13/741 |
| | | | | 188/72.1 |

OTHER PUBLICATIONS

Xiao et al. "A novel bidirectional and dual-redundancy hybrid electromagnetic brake for aircraft." Advances in Mechanical Engineering 8.9 (2016): 1687814016669478. 14 pages.

\* cited by examiner

INTEGRATED ASSYMMETRY BRAKE MECHANISM

BACKGROUND

Exemplary embodiments pertain to the art of aircraft and, more particularly, to an integrated asymmetry brake mechanism for an aircraft.

Aircraft include high lift systems, e.g., flaps, slats, and the like, that are operated during flight to adjust lift and/or create drag. High lift systems include failure mitigation systems. The failure mitigation system prevents flaps on one wing of the aircraft from deploying in the event flaps on the other wing cannot deploy. Asymmetric deployment of the high lift system are undesirable during flight. Some high lift system may employ no-backs that react to aircraft loads applied to an actuator output. Other high lift systems may employ an asymmetric brake that locks and prevents actuation of flaps on one wing when the flaps on the other wing fail to deploy.

Checking operational health of a no-back system pre-flight is a demanding process that often requires disconnecting the actuator output from the aircraft and applying an external load. Such a test takes time, requires technicians and increases pre-flight check costs. Asymmetrical brakes can be verified by generating a driveline load and applying that load to the asymmetry brake to verify operation. As such, verifying an asymmetry brake is less challenging that verifying a no-back system.

Current asymmetry brakes are often separate line replaceable units (LRU's) within the high lift system. By employed separate LRU's the asymmetry brakes represent increase weight, cost, and complexity for both the brake and mounting hardware in each wing. In addition, sizing separate asymmetry brake LRU's is often driven by a potential driveline jam which requires they asymmetry brake to react to a full power drive unit jam which is often greater tan the load needed to prevent an asymmetry condition. Accordingly, the industry would welcome an asymmetry brake system that combined integrated with a flap or slat actuator so as to reduce weight associated with a separate system including the need for separate mounting hardware.

BRIEF DESCRIPTION

Disclosed is an integrated asymmetric brake system for an aircraft including a housing and a control surface actuator arranged in the housing. The control surface actuator includes a torque limiter output member and is operable to selectively deploy and retract a control surface. An asymmetry brake system is arranged in the housing and is operably connected to the control surface actuator and the torque limiter output member. The asymmetry brake system is selectively operable to prevent deployment of the control surface by activating the torque limiter output member upon detecting an asymmetry event. An asymmetry brake test monitor switch is mounted in the housing and operably coupled to the asymmetry brake system. The asymmetry brake test monitor switch is monitored to confirm functionality of the asymmetry brake system prior to flight.

Also disclosed is an aircraft including a fuselage and a first wing extending from the fuselage. The first wing includes a first control surface. A second wing extends from the fuselage and includes a second control surface. An integrated asymmetric brake system is coupled to at least one of the first control surface and the second control surface. The integrated asymmetric brake system includes a housing and at least one control surface actuator arranged in the housing. The at least one control surface actuator includes a torque limiter output member and is operable to selectively deploy and retract one of the first and second control surfaces. An asymmetry brake system is arranged in the housing and is operably connected to the at least one control surface actuator and the torque limiter output member. The asymmetry brake system is selectively operable to prevent deployment of the one of the first and second control surfaces if the other of the first and second control surfaces fails to deploy by activating the torque limiter output member.

An asymmetry brake system arranged in the housing and operably connected to the control surface actuator and the torque limiter output member, the asymmetry brake system being selectively operable to prevent deployment of the control surface by activating the torque limiter output member upon detecting an asymmetry event. An asymmetry brake test monitor switch is mounted in the housing and operably coupled to the asymmetry brake system. The asymmetry brake test monitor switch is monitored to confirm functionality of the asymmetry brake system prior to flight.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
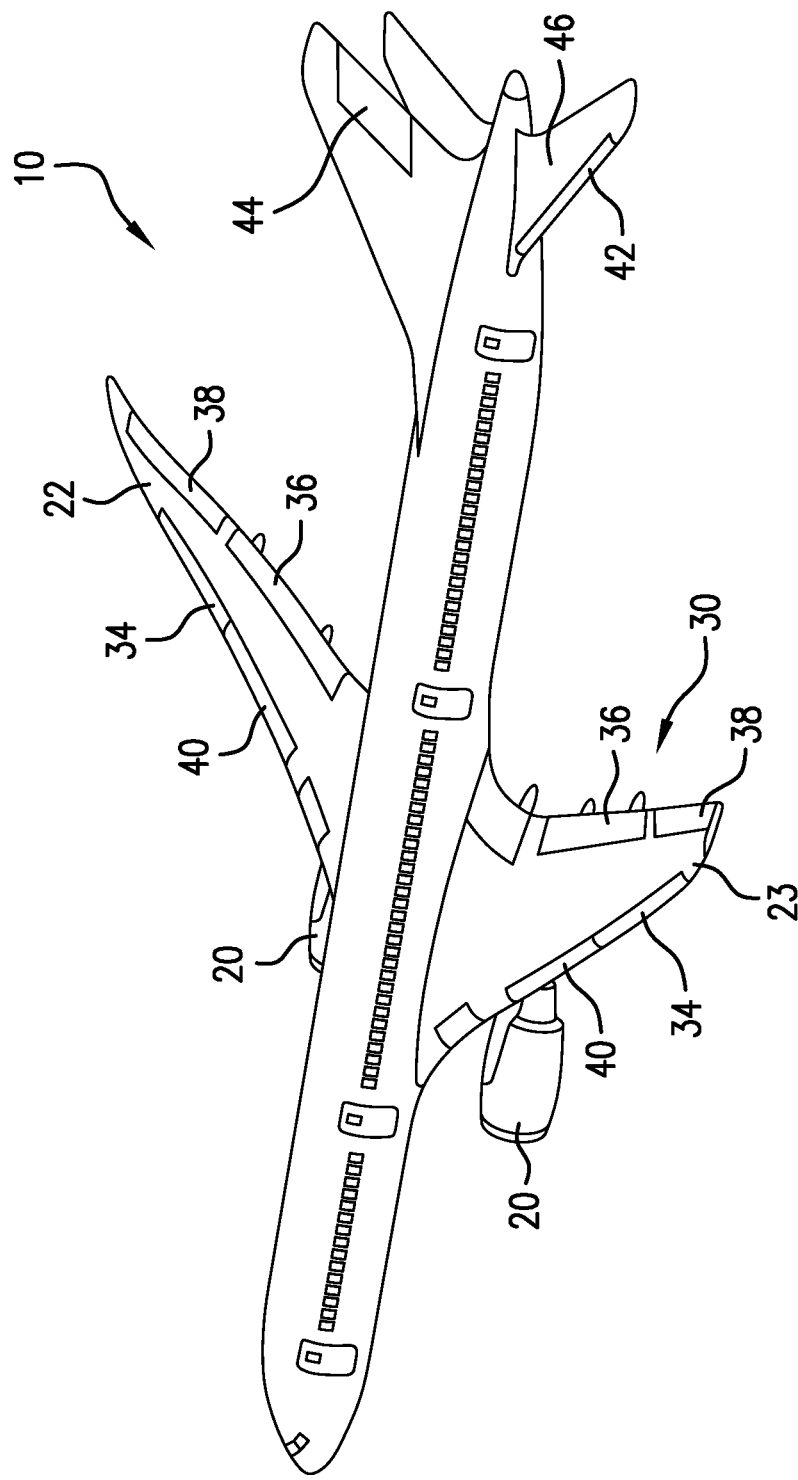
FIG. 1 depicts an aircraft including an integrated asymmetric brake system, in accordance with an exemplary aspect.

FIG. 1 illustrates an example of an aircraft 10 having aircraft engines 20 and two wings 22 and 23 that extend from a fuselage 26. Each wing 22, 23, includes one or more high lift systems 30. Each high lift system 30 includes control surfaces such as slats 34 and flaps 36. At this point it should be understood that while shown as including a single surface, each slat 34 and each flap 36 may include multiple surfaces. The aircraft further includes additional control surfaces such as ailerons 38, spoilers 40, horizontal stabilizer trim tabs 42, rudder 44 and horizontal stabilizer 46. It will be understood that the slats 34 and/or the flaps 36 can include one or more slat/flap panels that move together.

Each of the control surface can be moved by one or more actuators that are part of actuator system 48. Actuator system 48 can include one or more of: a flap rotary actuator, flap drop boxes, slat rotatory actuators, angle gear boxes, a controller that control the position of the slats/flaps by controlling operation of the actuators, slat and flap disconnect sensors, slat and flap skew sensors, flat and slat position sensors, slat driveline torque shafts, flap driveline torque sensors, flap and slat power drive units.

Figure 2:
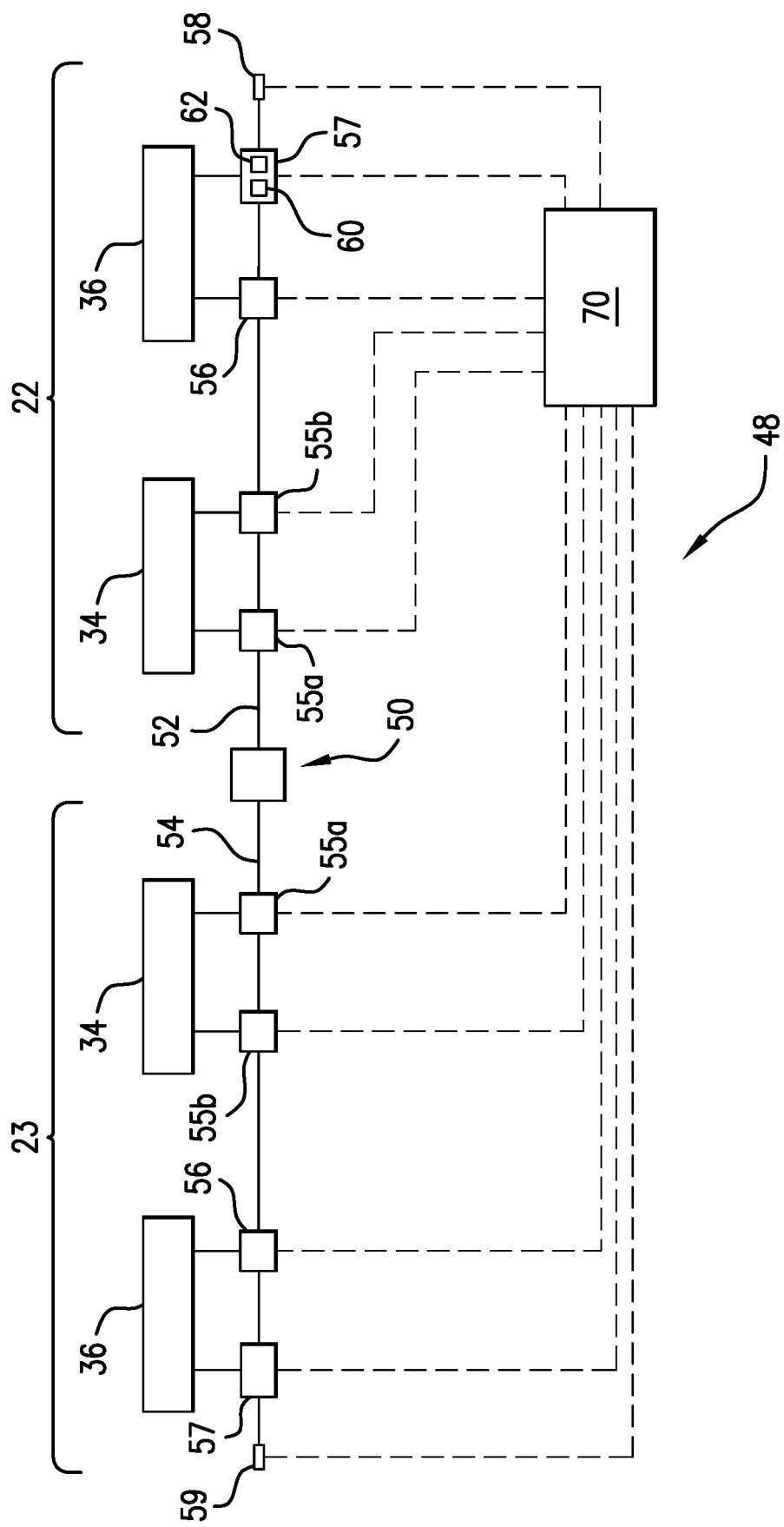
FIG. 2 depicts a block diagram showing the integrated asymmetric brake system as part of a control surface actuation system, in accordance with an exemplary aspect.

With reference now to FIG. 2, actuation system 48 is shown to include a drive unit 50 that is coupled to each control surface. In the embodiment shown, drive unit 50 is depicted as being connected to slats 34 and flaps 36. More specifically, each slat 34 and each flap 36 in each wing 22, 23 is connected to drive unit 50 via a corresponding torque shaft 52 and 54. Each torque drive shaft 52, 54, is coupled to each slat 34 via first and second actuators 55a and 55b. Each flap 36 is connected to corresponding ones of drive shafts 52 and 54 via a corresponding actuator 56 and an integrated actuator and asymmetric brake system 57. Each wing 22, 23 also include a corresponding control surface position sensor 58 and 59.

In an exemplary embodiment, integrated actuator and asymmetric brake system 57 includes an actuator 60 that operates to both deploy flap 36 in wing 22 and an asymmetric brake system 62 that prevents flap deployment in the event that corresponding movement is not detected in flap 36 in wing 23. A controller 70 is coupled to actuation system 48 and operated to selectively shift the associated control surfaces as well as to actuate asymmetric brake system 62 as will be detailed herein. It should be understood that others of the control surfaces may be connected to actuation system 48 or, in the alternative, to dedicated actuation systems for each control surface.

Figure 3:
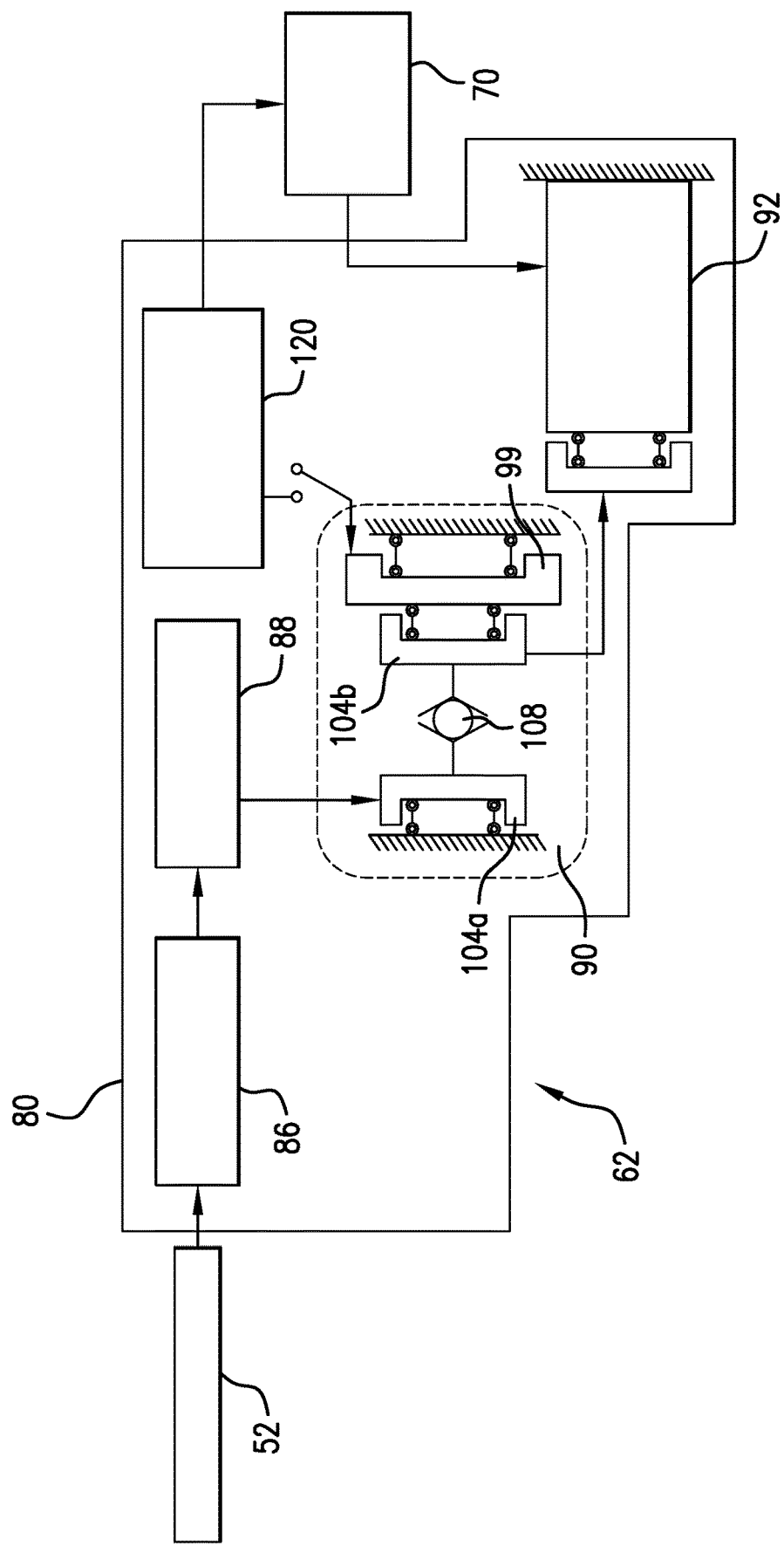
FIG. 3 is a block diagram depicting the integrated asymmetric brake system in an unlocked configuration, in accordance with an exemplary aspect.

At this point, a detailed description will follow with reference to FIG. 3 regarding asymmetric brake system 62 of integrated asymmetric brake system 57 in wing 22 with an understanding that integrated asymmetric brake system 57 in wing 23 includes similar systems. Asymmetric brake system 62 includes a housing 80 that, in addition to enclosing actuator 60 (not shown) also encloses components of asymmetric brake 62. Housing 80 that contains a torque limiter output member 86 which may be employed to actuator 60 and drive shaft 52 if an asymmetry condition exists. That is, torque limiter output member 86 may be employed to limit an amount of torque that may be transferred to an asymmetry gear train 88 under a jam or disconnect condition.

Figure 4:
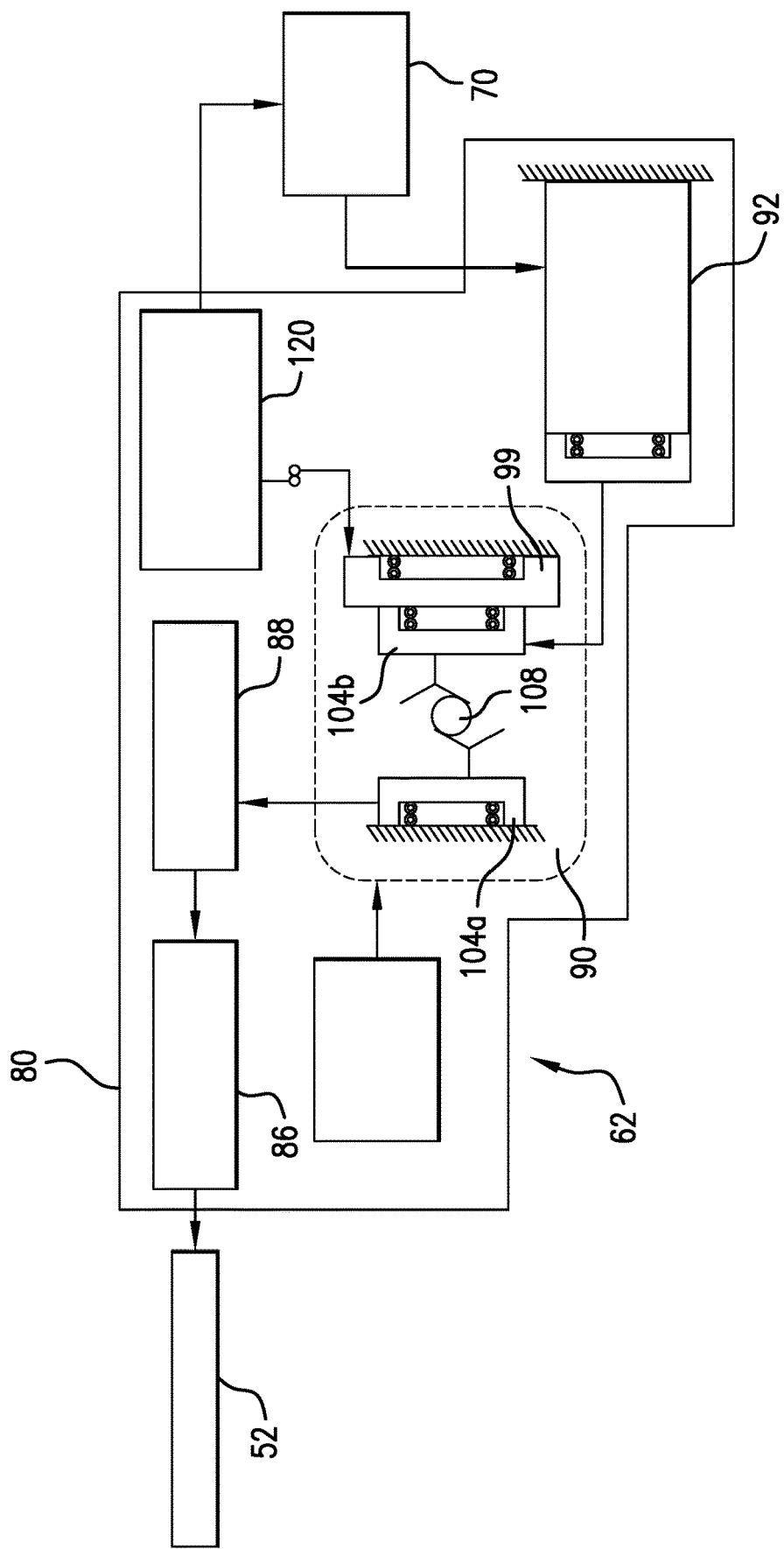
FIG. 4 is a block diagram depicting the integrated asymmetric brake system in a locked configuration, in accordance with an exemplary aspect.

Asymmetry gear train 88 is coupled torque limiter output member 86 and to a ball ramp brake assembly 90 which controls actuation of flap 36. Ball ramp brake assembly 90 may transition between an open or freewheeling configuration, such as shown in FIG. 3 to a locked configuration such as shown in FIG. 4. In the open configuration such as shown in FIG. 3, flap 36 may be deployed. However, if a potential asymmetry or failure of flap 36 in wing 23 to deploy is sensed, ball ramp brake assembly 90 is activated by a dual channel electro-mechanical (EM) brake 92 to prevent flap deployment in wing 22 as will be discussed herein.

Ball ramp brake assembly 90 may take the form of a cone or multi-plate design. Ball ramp brake assembly 90 will include a spring (not shown) having a preload that is based on free rotation drag of dual channel E/M brake 92. The output of ball ramp brake assembly 90 will feed into dual channel E/M brake 92 which will rotate freely when brake is powered, e.g., free. When commanded by controller 70 to lock actuation system 48 in place, dual channel E/M brake 92 closes causing ball ramp assembly 90 to activate. Once ball ramp assembly 90 activates, a high gain function of the cone or multi-plate ball ramp brake assembly 90 will lock in place resisting externally applied torque by an amplification/ gain value provided by the mechanism. It should be noted that once the ball ramp brake assembly 90 is activated, dual channel E/M brake 92 is no longer in the direct load path of asymmetric brake system 62. Activation of ball ramp brake assembly 90 will cause asymmetry gear train 88 to trigger torque limiter output member 86 to lock in place and capture driveline loading at asymmetry brake system 62.

In an embodiment, when EM brake 92 is commanded by controller 70 to lock flap 36, ball ramp brake assembly 90 closes as shown in FIG. 4. Ball ramp assembly 90 includes a spring loaded reaction plate 99 and a pair of spring loaded ball ramps 104a and 104b that support a ball 108. If a lock up condition is indicated, EM brake 92 pulls spring loaded reaction plate 99 inwardly creating a radial offset of spring loaded ball ramps 104a and 104b as shown in FIG. 4. The radial offset prevents flap 36 from deploying and creating an asymmetry condition.

In addition to including the mechanism for actuating flap 36, and preventing asymmetric flap deployment, integrated asymmetric brake system 56 includes an asymmetry torque test monitor switch 120 that is employed pre-flight to check operation of ball ramp brake assembly 90 prior to take off. Prior to take off, a test load is applied by drive unit 50 to actuator input shaft 52. Asymmetry torque test monitor switch 120 reacts to the test load by engaging ball ramp brake assembly 90. If ball ramp brake assembly 90 responds properly, a positive feedback signal is passed from asymmetry brake torque test switch 120 to controller 70 indicating proper operation. If, on the other hand, if ball ramp brake assembly 90 does not react properly, a negative feedback signal is passed from asymmetry brake torque test switch 120 to controller 70 indicating improper operation. A negative feedback signal would signal operators that maintenance is required prior to take off.

Figure 5:
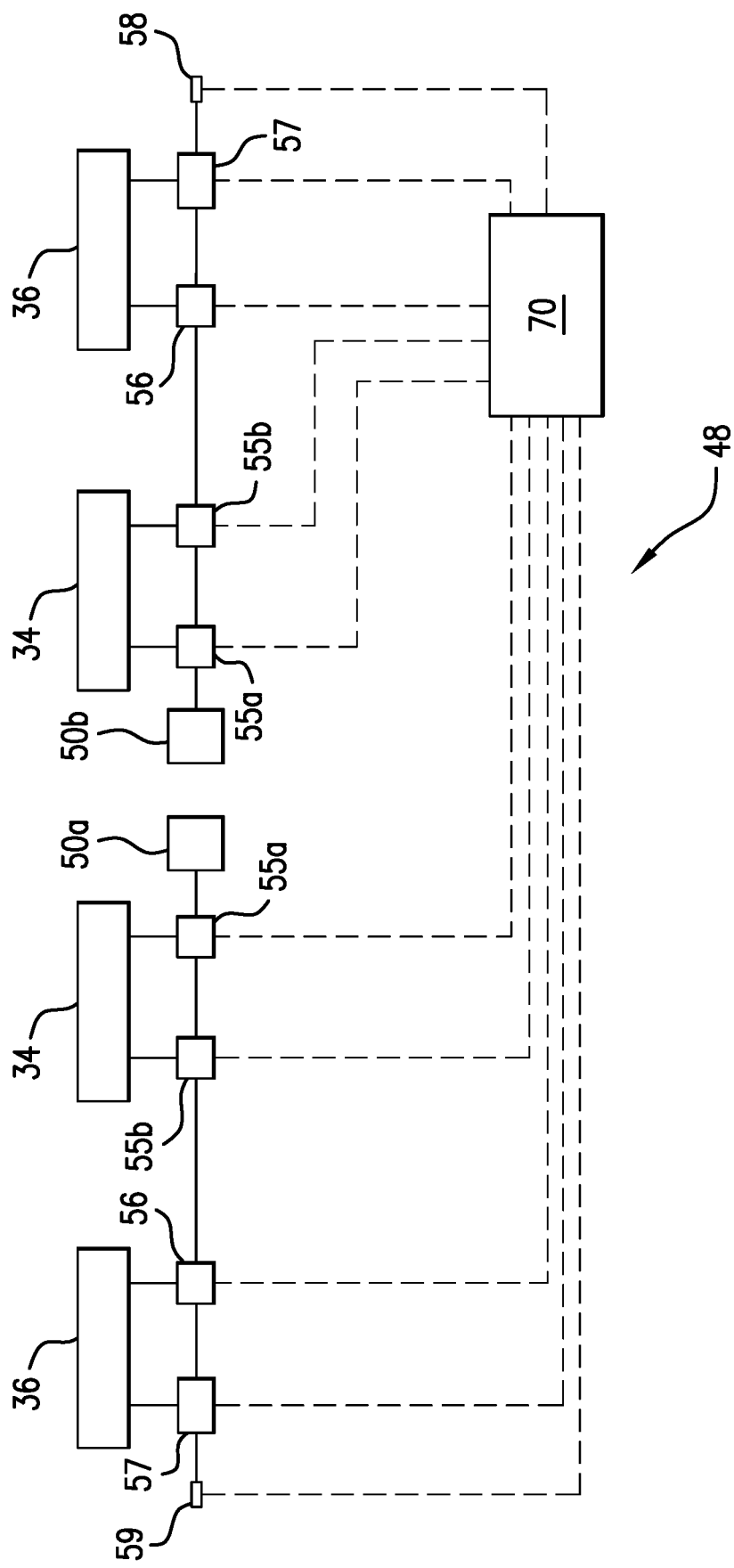
FIG. 5 depicts a block diagram showing the integrated asymmetric brake system as part of a dual drive unit control surface actuation system, in accordance with an exemplary aspect.

While described as including a single drive unit 50, it should be understood that actuation system 48 may include dual drive units such as shown at 50A and 50B in FIG. 5, wherein like reference numbers represent corresponding parts in the respective views. In a dual drive unit system, each asymmetric brake actuator 57 communicates with a corresponding drive unit 50A and 50B to lock actuation of slats and/or flaps in the event an asymmetry condition is detected as well during a pre-flight to check operation of each ball ramp brake assembly 90 prior to take off.

At this point, it should be understood that the integrated asymmetry brake system represents a self-contained unit that may operate a control surface, prevent actuation of the control surface in the event of a sensed asymmetry condition and provide a pre-flight check to confirm proper operation. Incorporating all of the aforementioned systems into a single unit leads to a more compact size resulting in reduced wing weight, lower costs, and the creation of a line replaceable unit (LRU) that may be readily serviced in any maintenance facility there by reducing aircraft downtime.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An integrated asymmetric brake system for an aircraft comprising:
   a housing;
   a control surface actuator arranged in the housing, the control surface actuator including a torque limiter output member and being operable to selectively deploy and retract a control surface;
   an asymmetry brake system arranged in the housing and operably connected to the control surface actuator and the torque limiter output member, the asymmetry brake system including a dual channel electro-mechanical (E/M) brake operatively connected to a ball ramp assembly, the ball ramp assembly, when deployed removes the dual channel E/M brake from a direct load path of the asymmetry brake system and prevents deployment of the control surface by activating the torque limiter output member upon detecting an asymmetry event; and
   an asymmetry brake test monitor switch mounted in the housing and operably coupled to the asymmetry brake system, the asymmetry brake test monitor switch being monitored to confirm functionality of the asymmetry brake system prior to flight.

2. The integrated asymmetric brake system according to claim 1, wherein the asymmetry brake system includes an asymmetry gear train mounted in the housing.

3. The integrated asymmetric brake system according to claim 2, wherein the asymmetry gear train comprises an asymmetry brake.

4. An aircraft comprising:
   a fuselage;
   a first wing extending from the fuselage, the first wing including a first control surface;
   a second wing extending from the fuselage, the second wing including a second control surface; and
   an integrated asymmetric brake system coupled to the first control surface and the second control surface, the integrated asymmetric brake system comprising:
      a housing;
      at least one control surface actuator arranged in the housing, the at least one control surface actuator including a torque limiter output member and being operable to selectively deploy and retract one of the first and second control surfaces;
      an asymmetry brake system arranged in the housing and operably connected to the control surface actuator and the torque limiter output member, the asymmetry brake system including a dual channel electro-mechanical (E/M) brake operatively connected to a ball ramp assembly, the ball ramp assembly, when deployed removes the dual channel E/M brake from a direct load path of the asymmetry brake system and prevents deployment of the one of the first and second control surfaces if the other of the first and second control surfaces fails to deploy by activating the torque limiter output member; and
      an asymmetry brake test monitor switch is mounted in the housing and operably coupled to the asymmetry brake system, the asymmetry brake test monitor switch being monitored to confirm functionality of the asymmetry brake system prior to flight.

5. The aircraft according to claim 4, wherein the asymmetry brake system includes an asymmetry gear train mounted in the housing.

6. The aircraft according to claim 5, wherein the asymmetry gear train comprises an asymmetry brake.

* * * * *